US012521337B2

(12) United States Patent
Lin et al.

(10) Patent No.: US 12,521,337 B2
(45) Date of Patent: Jan. 13, 2026

(54) TOPICAL PREPARATIONS COMPRISING BIODEGRADABLE POLYALKOXYLATED POLYOLS POLYESTER

(71) Applicant: APPLECHEM INC., Parsippany-Troy Hills, NJ (US)

(72) Inventors: Samuel Q. Lin, Paramus, NJ (US); Timothy Cuneo, Ringwood, NJ (US); Joon Ho Roh, Ellicott City, MD (US); Xu Qin, Northvale, NJ (US)

(73) Assignee: APPLECHEM INC., Parsippany-Troy Hills, NJ (US)

( * ) Notice: Subject to any disclaimer, the term of this patent is extended or adjusted under 35 U.S.C. 154(b) by 0 days.

(21) Appl. No.: 18/140,646

(22) Filed: Apr. 28, 2023

(65) Prior Publication Data

US 2023/0346683 A1 Nov. 2, 2023

Related U.S. Application Data

(63) Continuation-in-part of application No. 17/838,503, filed on Jun. 13, 2022, now abandoned, which is a continuation of application No. 16/369,544, filed on Mar. 29, 2019, now abandoned, which is a continuation-in-part of application No. 15/652,679, filed on Jul. 18, 2017, now abandoned.

(60) Provisional application No. 62/499,642, filed on Feb. 1, 2017, provisional application No. 62/495,444, filed on Sep. 15, 2016.

(51) Int. Cl.
| | |
|---|---|
| *A61K 8/86* | (2006.01) |
| *A61K 8/85* | (2006.01) |
| *A61K 47/34* | (2017.01) |
| *A61Q 5/02* | (2006.01) |
| *A61Q 19/10* | (2006.01) |
| *C08G 63/06* | (2006.01) |
| *C08G 63/48* | (2006.01) |
| *C08G 63/664* | (2006.01) |
| *C08G 63/668* | (2006.01) |

(52) U.S. Cl.
CPC .......... *A61K 8/85* (2013.01); *A61K 8/86* (2013.01); *A61K 47/34* (2013.01); *A61Q 5/02* (2013.01); *A61Q 19/10* (2013.01); *C08G 63/48* (2013.01); *C08G 63/668* (2013.01); *A61K 2800/43* (2013.01); *A61K 2800/48* (2013.01); *A61K 2800/524* (2013.01); *A61K 2800/596* (2013.01)

(58) Field of Classification Search
CPC ........ A61K 2800/48; A61K 8/85; A61K 8/86; A61K 47/34; C08G 63/48; C08G 63/668; C08G 63/664; C08G 63/06
See application file for complete search history.

(56) References Cited

U.S. PATENT DOCUMENTS

| | | | | |
|---|---|---|---|---|
| 5,464,874 | A * | 11/1995 | Balzer | A61K 8/463 |
| | | | | 514/846 |
| 5,868,826 | A | 2/1999 | Fischer | |
| 6,013,813 | A | 1/2000 | O'Lenick, Jr. | |
| 6,351,443 | B1 | 2/2002 | Freeman | |
| 7,553,495 | B2 | 6/2009 | Loeffler | |
| 7,709,011 | B2 | 5/2010 | Klug | |
| 2004/0234486 | A1 * | 11/2004 | Hashimoto | A61Q 19/10 |
| | | | | 424/70.16 |
| 2010/0111883 | A1 | 5/2010 | Vitins | |
| 2013/0079536 | A1 * | 3/2013 | Chen | C11D 1/667 |
| | | | | 554/213 |
| 2015/0011599 | A1 * | 1/2015 | Avila | A01N 25/04 |
| | | | | 514/395 |
| 2015/0065630 | A1 | 3/2015 | Mangnus | |
| 2015/0232676 | A1 | 8/2015 | Hiraoka | |
| 2017/0049692 | A1 * | 2/2017 | Stout | A61K 8/922 |
| 2018/0071198 | A1 | 3/2018 | Lin et al. | |
| 2018/0072817 | A1 * | 3/2018 | Lin | A61K 8/466 |
| 2019/0224106 | A1 | 7/2019 | Lin et al. | |
| 2019/0224107 | A1 | 7/2019 | Lin et al. | |
| 2022/0313592 | A1 * | 10/2022 | Lin | A61K 8/85 |
| 2022/0313593 | A1 * | 10/2022 | Lin | C08G 63/668 |

FOREIGN PATENT DOCUMENTS

| | | |
|---|---|---|
| CN | 111763311 A | 10/2020 |
| EP | 3714945 A1 | 9/2020 |
| EP | 3714946 A1 | 9/2020 |
| EP | 4292580 A1 | 12/2023 |
| JP | 2020-164467 A | 10/2020 |

OTHER PUBLICATIONS

Kortemeier, U., et al. "Thickening agents for surfactant systems." SÖFW Journal 136.3 (2010): 30. (Year: 2010).*
Cosmetic Ingredient Review, Safety Assessment of Polysorbates as Used in Cosmetics, obtained online at: https:// www .cir-safety.org/ supplementaldoc/safety-assessment-polysorbates-used-cosmetics, pp. 1-48. (Year: 2015).*
Nalawade, TM. Bhat K., Sogi SH. Bactericidal activity of propylene glycol, glycerine, polyethylene glycol 400, and polyethylene glycol 1000 against selected microorganisms. J Int Soc Prev Community Dent. 2015:5(2):114-119 (Year: 2015).
Xu, Yu-lei et al. "Shear thickening fluids based on additives with different concentrations and molecular chain lengths." Chinese Journal of Chemical Physics 23.3 (2010); 342. (Year: 2010).
Foreign Office Action—Japan—PF15879—2019-066765. Dated Mar. 1, 2023 (consisting of 10 pages).

* cited by examiner

*Primary Examiner* — Abigail Vanhorn
(74) *Attorney, Agent, or Firm* — Gearhart Law LLC

(57) ABSTRACT

Compounds contained herein relate to biodegradable thickening agents (e.g., polyalkoxylated polyol polyesters) having a viscosity that allows a product to be poured, yet retained on a desired surface to which it is applied. Embodiments of the compounds may be exemplified by the formula:

$$Q\text{-}[(OA)_n\text{-}OR]_m.$$

24 Claims, No Drawings

TOPICAL PREPARATIONS COMPRISING BIODEGRADABLE POLYALKOXYLATED POLYOLS POLYESTER

CLAIM OF PRIORITY

This application claims priority to U.S. application Ser. No. 17/838,503 filed on Jun. 13, 2022, which claims priority to U.S. application Ser. No. 16/369,544 filed on Mar. 29, 2019, which claims priority to U.S. application Ser. No. 15/652,679 filed on Jul. 18, 2017, which claims priority to U.S. Application 62/499,642 filed on Feb. 1, 2017, and U.S. Application 62/495,444 filed on Sep. 15, 2016, the contents of all of which are herein fully incorporated by reference in its entirety.

FIELD OF THE EMBODIMENTS

The field of the present invention and its embodiments relate to thickening agents that generate a viscosity that allows a product to be poured, yet retained on a desired surface to which it is applied.

BACKGROUND OF THE EMBODIMENTS

Rheology, or the study of the flow of matter, is applied to consumer products, such as shower gel, shampoo, liquid detergent, liquid dishwashing detergent, liquid hand soap, skin care lotion or cream, hair conditioner, hair styling products, etc. to create a particular viscosity profile. Such a profile is critical to a consumer's product preference and eventual purchasing decision.

Consumers will prefer a product with a rheology profile that causes the product to be stable in the container, have a low enough viscosity to pour out of the container easily, and yet be thick enough to apply to the body, hair, or fabric without dripping out of the consumer's hand or the applied surface. Additionally, the product must be stable and maintain a consistent rheology profile during storage in the warehouse, while in transportation, and while on the shelf for potentially many years.

Consumers further prefer a product that is friendly to environment, for example, biodegradable in environment to harmless by products, so that it will not accumulate permanently in environment. Therefore, the most preferred product by consumers has to be both of effective in thickening the composition and biodegradable in natural environment.

There are a number of commercial thickeners using esters of polyalkoxylated polyols and fatty acids to thicken surfactant-containing preparations. Examples of commercial products include polyethylene glycol 6000 distearate, also known by the INCI name of PEG-150 distearate; PEG 120 methyl glucose dioleate and PEG 120 methylglucose trioleate (Glucomate™ DOE 120 and Glucomate™ VLT); PEG-150 Pentaerythrityl Tetrastearate (Crothix™, Crothix™ Liquid, and Versathix™); PEG-150 Polyglyceryl-2 Tristerate (Genapol LT); PEG/PPG-120/10-Trimethlolpropane Trioleate (Arlypon TT). The number of hydrophilic polyalkoxylated arms are two for PEG-150 distearate, three for Arlypon TT, four for Genapol LT and Crothix, Crothix Liquid, and Versathix, and five for Glucomate DOE 120.

U.S. Pat. No. 5,192,462 (Gloor et al.) pertains to a thickening agent comprising a tetra ester made of fatty acids and a polyoxyethylene pentaerythritol with four hydrophilic poly-(ethylene glycol) arms. Its preferred chemical structure is the PEG-150 Pentaerythrityl Tetrastearate, where all four hydrophilic poly-(ethylene glycol) arms are capped with stearic fatty acids, and is the base of Crothix, Crothix liquid, and Versathix Liquid.

U.S. Pat. Nos. 7,709,011 and 7,553,495 (both Klug, et al.), pertains to a thickening agent of oxyalkylated polyglycerol esters with fatty acid for surfactant-containing topical preparation as shown below.

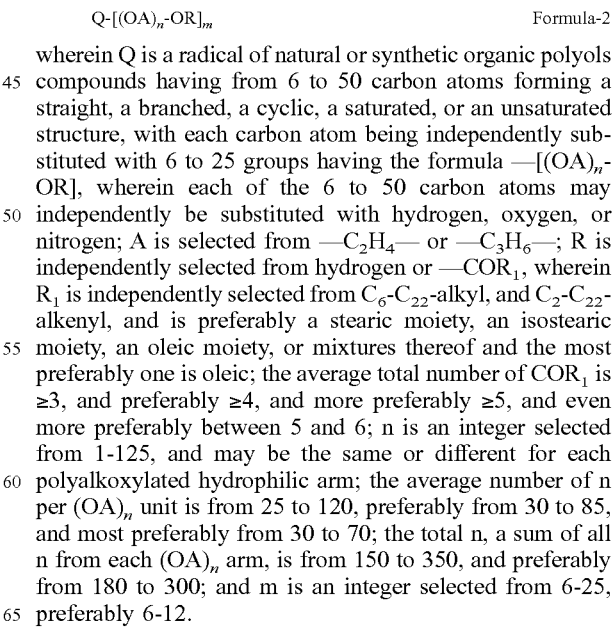

Formula-1

In which A is a group of the formula —$C_2H_4$— or —$C_3H_6$—, B is a hydrogen or group of the formula —COR, where at least one symbol B is a group of the formula —COR—, R is $C_7$-$C_{21}$-Alkyl, $C_7$-$C_{21}$-hydroxyalkyl or Alkenyl, n is a number of 1 to 30, and x, y, z are numbers from 0 to 100, where the sum of x, y, and z is 50-250. (see Column 1, lines 43-48).

US20180072817 and US20180071198, both owned by Applicant, pertain to compounds that relate to polyalkoxylated polyol polyesters having a viscosity that allows a product to be poured, yet retained on a desired surface to which it is applied. Embodiments of the compounds may be exemplified by the formula: Q-[(OA)n-OR]m.

To those skilled in the art, the number of hydrophilic poly-(ethylene glycol)—arms equals to n+2. When n=30 and x+y+z=250, the average number of ethylene glycol units or (x+y+Z)/(n+2) is [250/(30+2)] and is about 7.81 at maximum.

SUMMARY OF THE EMBODIMENTS

The embodiments of the present application teach and describe new polyalkoxylated polyols polyester (e.g., thickening agent) conforming to Formula-2, which is a reaction product of (a) fatty acid and (b) polyalkoxylated polyols.

Q-[(OA)$_n$-OR]$_m$   Formula-2 wherein Q is a radical of natural or synthetic organic polyols compounds having from 6 to 50 carbon atoms forming a straight, a branched, a cyclic, a saturated, or an unsaturated structure, with each carbon atom being independently substituted with 6 to 25 groups having the formula —[(OA)$_n$-OR], wherein each of the 6 to 50 carbon atoms may independently be substituted with hydrogen, oxygen, or nitrogen; A is selected from —$C_2H_4$— or —$C_3H_6$—; R is independently selected from hydrogen or —COR$_1$, wherein R$_1$ is independently selected from $C_6$-$C_{22}$-alkyl, and $C_2$-$C_{22}$-alkenyl, and is preferably a stearic moiety, an isostearic moiety, an oleic moiety, or mixtures thereof and the most preferably one is oleic; the average total number of COR$_1$ is ≥3, and preferably ≥4, and more preferably ≥5, and even more preferably between 5 and 6; n is an integer selected from 1-125, and may be the same or different for each polyalkoxylated hydrophilic arm; the average number of n per (OA)$_n$ unit is from 25 to 120, preferably from 30 to 85, and most preferably from 30 to 70; the total n, a sum of all n from each (OA)$_n$ arm, is from 150 to 350, and preferably from 180 to 300; and m is an integer selected from 6-25, preferably 6-12.

In another embodiment of the invention there are cosmetic, dermatological, pharmaceutical, personal cleansing, fabric cleansing, and household & Industrial & institution cleansing preparations containing the polyalkoxylated polyols polyester of Formula-2.

The polyesters of the embodiments of the invention are suitable as a thickener, rheology modifier, and dissolver for aqueous, aqueous/alcoholic, and surfactant-containing preparations. Examples of these surfactant-containing preparations, emulsions, and suspensions are shampoo, shower preparations, shower gels, foam baths, facial cleansers, hand soap, bar soap, shaving creams, hair conditioners, deodorants, lotions, creams, ointments, wet wipes, antiperspirants, sunscreens, etc. The embodiments of the invention are also suitable as a thickener and rheology modifier for fabric care products, such as fabric conditioners and liquid laundry detergents; as a thickener and rheology modifier for dish washing liquid, for liquid carpet shampoo and liquid floor cleaner, for car wash liquid soap/detergent, for household and industrial liquid cleaning products, etc.

Based on the finished formulation, the preparation, the cleansing preparation, the emulsions, and suspensions according to this invention comprise preferably 0.05% to 20% by weight, particularly preferably 0.1% to 10% by weight, especially preferably 0.5% to 5% by weight of the polyalkoxylated polyols polyester of Formula-1.

The cleansing compositions according to the embodiments of the present invention can further comprise at least one of the following ingredients: all customary anionic, cationic, zwitterionic, nonionic, and amphoteric surfactants; all customary skin and hair benefit actives such as, for example, cosmetic oils, petrolatum, vegetable oils, hydrogenated vegetable oils, UV filters, proteins, shining agents, anti-aging agents, amino acids, bioactives, humectants, conditioning polymers, silicones, cationic polymers, sucrose polyesters, anti-dandruff zinc salt, hydroxyacids, skin lightening agents; all customary stabilizers, such as, for example, silica, 12-hydroxystearic acid, hydrogenated castor oil, ethylene glycol distearate, bentonite and hectorite clay, fatty acids, fatty alcohols; all customary thickeners such as, for example, hydroxyethyl cellulose, xanthan gum, polyacrylate, modified or non-modified starch, etc; all customary dye, coloring agents, pearlizers, perfumes, chelators, solvents, humectants, salts, etc.

The total amount of the surfactants used in the composition of this invention can, based on the finished composition, be between 5% and 70% by weight, preferably between 10 and 40% by weight, and most preferably between 12% and 35% by weight.

Definitions

As used above, and throughout this disclosure, the following terms, unless otherwise indicated, shall be understood to have the following meanings. If a definition is missing, the conventional definition known to one skilled in the art controls.

As used herein, the terms "including," "containing," and "comprising" are used in their open, non-limiting sense.

As used herein, the singular forms "a," "an," and "the" include plural referents unless the context clearly dictates otherwise.

To provide a more concise description, some of the quantitative expressions given herein are not qualified with the term "about". It is understood that, whether the term "about" is used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. Whenever a yield or amount is given as a percentage, such yield or amount refers to the mass of the entity (percent by weight) for which the yield is given with respect to the maximum amount of the same entity that could be obtained under particular stoichiometric conditions. Concentrations that are given as percentages refer to mass ratios unless indicated differently.

As used herein, "alkyl" means a straight chain or branched saturated chain having from 1 to 30 or more carbon atoms. An alkyl group can be unsubstituted or substituted. Alkyl groups containing three or more carbon atoms may be straight, branched, or cyclized.

As used herein, an "alkenyl" includes an unbranched or branched hydrocarbon chain having one or more double bonds therein and having from 1 to 30 or more carbon atoms. The double bond of an alkenyl group can be unconjugated or conjugated to another unsaturated group. An alkenyl group can be unsubstituted or substituted.

The term "hydroxyl" means an OH group;

The term "hydroxyalkyl" means an alkyl group as defined above, where the alkyl group has an OH group disposed thereon.

The term "alkoxy" or "alkoxylated" as used herein includes —O-(alkyl), wherein alkyl is defined above.

As used herein, the term "composition" is intended to encompass a product comprising the specified ingredients in the specified amounts, as well as any product which results, directly or indirectly, from a combination of the specified ingredients in the specified amounts.

The term "amino" as used herein means a substituent containing at least one nitrogen atom.

As used herein, the term "substituted" means that the specified group or moiety bears one or more suitable substituents wherein the substituents may connect to the specified group or moiety at one or more positions.

As used herein, the term "unsubstituted" means that the specified group bears no substituents.

In formula 2, m is the total number of $(OA)_n$ arms, n is the number of repeat unit-OA in each arm. Total n means the sum of all n from all m arms. Sorbeth-xxx, such as Sorbeth-300, is an INCI (International cosmetic ingredient) name, where xxx is the total n.

All patents or patent applications referenced herein are fully incorporated by reference in their entirety.

DETAILED DESCRIPTION OF THE EMBODIMENTS OF THE INVENTION

In one embodiment, there is the polyalkoxylated polyols polyester of Formula-2, wherein Q is defined as a radical of natural or synthetic organic polyols compounds, having carbon, hydrogen, oxygen, and nitrogen elements, and being straight, branched, cyclic, saturated, or unsaturated, and wherein Q has from 6 to 50 carbon atoms, and is independently substituted with from 6 to 25 groups having the formula of —[$(OA)_n$-OR]

$$Q\text{-}[(OA)_n\text{-}OR]_m \qquad \text{Formula-2}$$

Wherein A is selected from —$C_2H_4$— or —$C_3H_6$—; n is from 1-125; R is independently selected from hydrogen or —$COR_1$; and $R_1$ is independently selected from $C_6$-$C_2$-alkyl and $C_2$-$C_{22}$-alkenyl; wherein $R_1$ is preferably a stearic moiety, an isostearic moiety, an oleic moiety, or mixtures thereof and the most preferable one is oleic; and the average total number of $COR_1$ is $\geq 3$, and preferably $\geq 4$, and more preferably ≥5, and even more preferably between 5 and 6; and m is an integer selected from 6-25, preferably from 6-12. The n for each hydrophilic poly-(alkylene glycol)—arms can range from 1-125, and the average number of n is from 25 to 120, preferably from 30-85, and most preferably from 30 to 70. The total n is selected from 150-350, and preferably from 180-300.

The polyalkoxylated polyol polyester (Formula-2) of this invention is prepared by one or more reaction stages. The polyalkoxylated polyols are prepared by the alkoxylation of the polyol compounds, having 6 to 20 hydroxyl groups, with ethylene oxide or propylene oxide at 130° C.-200° C. after drying the mixture of the polyols compound and a base catalyst such as KOH, NaOH, or Calcium metal at 100° C.-200° C. under vacuum. The alkylene oxides are metered into the reactor under pressure over the course of 10-20 hours. Ethylene oxide, propylene oxide, or a mixture of ethylene oxide and propylene oxide can be used, resulting in primary —OH group, secondary —OH group, or mixtures thereof.

The organic polyol compounds (Q) of the embodiments of this invention can be natural polyols or synthetic polyols having at least six hydroxyl groups, and their examples are shown (but not limited to) from the following classes of compounds:
1. Sugar alcohols, also called polyhydric alcohol or poly-alcohol with at least six hydroxyl groups, have the general formula of $HOCH_2(CHOH)_xCH_2OH$. Examples include, but are not limited to, mannitol, sorbitol, galactitol, fucitol, iditol, inositol, volemitol, isomalt, maltitol, lactitol, maltotritol, maltotetraitol, and polyglycitol.
2. Disaccharide, is formed from two monosaccharide by dehydration via glycosidic linkage. Examples include but are not limited to, trehalose, sucrose, lactose, maltose, etc. They contain six or more hydroxyl groups.
3. Dextrin with a chemical structure of $(C_6H_{10}O_5)_z$, where n is from 2 to 20.
4. Di-Pentaerythritol
5. Dendrimer polyols. For example, Bolton*H2004, H2003, and H20 have 6, 12, and 16 terminal hydroxyls, respectively.
6. Polyglyceryls with 3 to 10 glycerin units, with six or more hydroxyl groups.

After the reaction, each hydroxyl group of the starting polyol compound will grow to a hydrophilic poly-(alkylene glycol) arm. The length of all arms may be the same or different, depending on the reaction conditions.

The next reaction is an esterification reaction between the polyalkoxylated polyols compounds and the fatty acid, so that some or all of the hydrophilic poly-(alkylene glycol) arms are capped with fatty acid ester. The reaction is carried out between 120° C.-250° C. with or without the catalyst until the desired acid number or the degree of esterification is achieved. The preferred method is to use the esterification catalysts such as alkylbenzenesulfonic acid, methansulfonic acid, organotin catalyst, organotitanate catalyst, etc. The preferred mole ratio of fatty acid to the alkoxylated polyols compounds is to form esters of 50%-130% of the hydrophilic poly-(alkylene glycol) arms.

For example, when the starting polyol compound is sorbitol which will lead to six poly-(alkylene glycol) arms per sorbitol molecule, the mole ratio would be 3 to 7.8. When it is trehalose, which will lead to eight poly-(alkylene glycol) arms, the mole ratio is 4 to 10.4. The most preferred one is to form more than at least four fatty ester capped arms. In one such embodiment, a thickener of the present application has six arms, which is opposed to more conventional thickener compositions which may exhibit four arms, developed for thickening surfactant-based formulations. It is derived from, in at least one embodiment, natural sorbitol with ethylene oxide to provide the six hydrophilic arms. Subsequent reactions with the natural oleic acid form four hydrophobic interaction oleic groups at the end of each of the arms. The present application's thickeners thicken surfactant formulations by bridging surfactant micelles with hydrophobic fatty groups, resulting in a bridged micellar structure that is much larger than the original micelles. The two "uncapped" arms are hydrophilic and serve to boost water solubility while the four "capped" hydrophobic" arms attach to surfactants (micelles) with a given formulation.

In another embodiment, Q is the organic radical part of Sorbitol with 6 carbons, and Formula-3 is the chemical structure of polyols ester from the sorbitol starting compound.

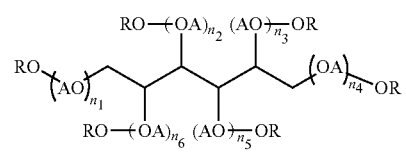

Formula-3

Another embodiment of this invention is the cosmetic, dermatological, and pharmaceutical preparations containing the polyalkoxylated polyols polyester (Formula-1) of this invention. The polyalkoxylated polyols polyester of this invention are suitable as a thickener, rheology modifier, dissolver, conditioner, and dispersant for aqueous, aqueous/alcoholic, and surfactant-containing preparations; as emulsifiers and suspending agents with a thickening action and bodying action for emulsions and suspensions. These surfactant-containing preparations, emulsions, and suspensions are, for example, shampoo, shower preparations, shower gels, foam baths, facial cleansers, hand soaps, bar soaps, shaving creams, hair conditioners, deodorants, lotions, creams, ointments, wet wipes, antiperspirants, sunscreens, liquid fabric conditioners, liquid laundry detergent, liquid dishwashing soap/detergent, all-purpose liquid cleansers, etc.

Based on the finished formulation, the cleansing preparation, and the preparations of emulsions and suspensions according to embodiments of this invention comprise preferably 0.05% to 20% by weight, particularly preferably 0.1% to 10% by weight, especially preferably 0.5% to 5% by weight of the polyalkoxylated polyols polyester of Formula-2 or Formula-3.

The cleansing compositions according to the embodiments of this invention can further comprise the following components: all customary anionic, cationic, zwitterionic, nonionic, and amphoteric surfactants; skin and hair benefit actives such as, for example, cosmetic oils, petrolatum, vegetable oils, hydrogenated vegetable oils, UV filters, proteins, shining agent, anti-aging agents, amino acids, bioactives, humectants, conditioning polymers, silicones, cationic polymers, sucrose polyester, anti-dandruff zinc salt, hydroxyacids, skin lightening agents; stabilizers, such as, for example, silica, 12-hydroxystearic acid, hydrogenated castor oil, ethylene glycol distearate, bentonite, and hectorite clay, fatty acid, fatty alcohol, etc.; other thickeners such as, for example, hydroxyethyl cellulose, xanthan gum, polyacrylate, modified or non-modified starch, etc.; and polyethylene glycols. The cleansing compositions can be in the form of liquid, paste, gels, or solid.

The total amount of the surfactants used in the composition of embodiments of this invention can, based on the finished composition, be between 5% and 70% by weight, preferably between 10% and 40% by weight, and most preferably between 12% and 35%.

Each of these components as well as preferred and optional components in the cleansing compositions is described below.

A. Detersive Surfactants

The customary detersive surfactants may be selected from anionic, cationic, non-ionic, amphoteric/zwitterionic surfactants, or mixtures thereof. The details of these customary detersive surfactants are known, such as U.S. Pat. Nos. 7,659,235 B2; 8,361,450 B2; 8,802,607B2; 3,929,678; 2,528,378; and McCutcheon's, Emulsifiers and Detergents, 1989 Annual, published by M.C. Publishing Co. Anionic surfactants may include alkyl sulfate or alkyl ether sulfate (including alkyl glycerol ether sulfate). They may also include the sulfate-free anionic surfactants as illustrated below.

Aliphatic sulfonate, such as a primary alkane (e.g. $C_8$-$C_{22}$) sulfonate, primary alkane disulfonate, $C_5$-$C_{22}$ alkene sulfonate, alkyl glyceryl ether sulfonate, aromatic alkyl sulfonate, or $C_5$-$C_{22}$ hydroxyalkane sulfonate.

Alkyl sulfosuccinates (including mono- and dialkyl, e.g. $C_6$-$C_2$ sulfosuccinates). Alkyl and acyl taurate, alkyl and acyl glycinates, alkyl sulfoacetate, alkyl phosphates, alkyl phosphate ester, alkyoxy alkyl phosphate esters, and acyl lactates, $C_8$-$C_{22}$ monoalkyl succinates and maleate. Fatty acyl isethionates, which are typically prepared by the reaction of isethionates salts such as alkali metal isethionates and aliphatic fatty acids of 8-20 carbon atoms. Commercial products of fatty acyl isethionates, for example, are DEFI, Hostapon SCI-78C, Jordapon CI prill, YA-SCI-85, Iselux LQ-CLR-SB, etc. Anionic carboxylate surfactants with the formula of R—$(CH_2CH_2O)_n$ $CO_2M$, wherein R is $C_8$-$C_{20}$ alkyl; n is 1 to 20; and M is a positive ion(s) such as sodium, potassium, etc. Another class of anionic surfactants is soap or the salts of fatty acids.

Sulfonate derivatives of alkyl polyglucoside, include for example, sodium laurylglucosides hydroxypropylsulfonate, and sodium decylglucosides hydroxypropylsulfonate.

Another sulfate-free mild surfactant is the class of alkanoyl surfactants prepared from amino acids. The alkyl group is $C_8$ to $C_{20}$, preferably $C_{12}$ to $C_{16}$ alkyl group. This class of surfactants may include, for example, alkanoyl sarcosinates, alkanoyl glycinate, and alkanoyl glutamate. The commercial products, for example, are Amisoft®, Amilite® of Ajinamoto, Eversoft of Sino Lion, etc.

The preferred anionic surfactants are the sulfate-free mild surfactants and their mixtures thereof. The proportion by weight of the anionic surfactants in the composition according to embodiments of this invention is in the range of 5% to 35% by weight, preferably 10% to 25% by weight.

Amphoteric or zwitterionic surfactants are surfactants with both positive and negative charges. They can be broadly described as derivatives of aliphatic quaternary ammonium, phosphonium, and sulfonium compounds, in which the aliphatic radicals can be straight or branched chain, and wherein one of the aliphatic radicals is from $C_8$ to $C_{18}$ carbon atoms, and one contains an anionic group, e.g., carboxyl, sulfonate, sulfate, phosphate, or phosphonate.

Examples may include the customary betaines, such as N-alkyl-N, N-dimethyl ammonium glycinates, coco-amidopropyl betaine; $C_{12}$-$C_{18}$-alkyldimethyl-sulfopropylbetain, and amine oxides. The proportion of the amphoteric surfactants in the composition according to embodiments of this invention is 0.5% to 30% by weight, and preferably 1%-15% by weight.

The non-ionic surfactants may include the alkoxylated aliphatic alcohol, acids, amides or alkyl phenol; long chain tertiary amine oxide; long chain tertiary phosphine oxides; dialkyl sulphoxides; sugar amides, such as described in U.S. Pat. Nos. 5,389,279 and 5,009,814; alkyl polyglucoside as described in U.S. Pat. Nos. 4,565,647 and 3,723,325. The preferred non-ionic surfactants are alkyl polyglucoside and alkyl polyglucamide. Examples of commercial products may include Plantaren® series of BASF, Ecosense® Series of Dow Chemicals, Gluco Tain® of Clariant, and Poly Suga Mulse of Colonial Chemicals. The proportion of the non-ionic surfactants according to embodiments of this invention is in the range of 1% to 20% by weight, and preferably of 1% to 15%.

Cationic surfactants are surfactants with positive charge groups. The suitable cationic surfactants may include quaternary ammonium salts, such as di-($C_{10}$-$C_{24}$)-alkyldimethylammonium chloride, ($C_{10}$-$C_{24}$)-alkyltrimethylammonium chloride or sulfate, and N-acylaminoethyl-N,N-diethyl-N-methyl ammonium chloride. Other customary cationic surfactants are described in reference of U.S. Pat. Nos. 8,470, 305 B2 and 8,470,305 B2. The proportion by weight of cationic surfactants in the composition according to embodiments of this invention is in the range of 1% to 10%, and preferably 1% to 7% by weight.

B. Liquid Crystal Inducers and Modifiers

Liquid crystal inducers are small non-ionic molecules and are believed to be solubilized in the mixtures of surfactants, thereby changing the packing of surfactant micelles to larger structure aggregates of different shapes and sizes, such as lamellar liquid structures or vesicles, rod, and cubic liquid crystals. The alternative name for the liquid crystal inducers is hydrophobic thickeners. They include the class of alkanoamides, alkylamineoxides, or mixtures thereof. Examples of this class include mono- and di-ethanolamides, isopropanolamides of fatty acids of 10-20 carbon atoms, PPG-hydroxyethyl cocamides and alkylamineoxides of 10-20 carbon atoms. Another class of chemicals in the liquid crystal inducers is alkoxylated alkyl alcohols of 8-18 carbon atoms, preferably 8-12 carbon atoms and 1-4 ethylene oxide units.

Liquid crystal modifiers include fatty acid and fatty alcohol of 8-20 carbon atoms, and aliphatic hydrocarbons of less than a molecular weight of 400 g/mole. It is believed that they modify the size and shape of the liquid crystals. U.S. Pat. No. 7,655,607B2 is a reference for the range and examples of liquid crystal inducers and modifiers.

C. Skin and Hair Benefit Actives

These benefit actives may be water-soluble, water-insoluble, or water dispersible. The water-soluble actives may include, but not limited to, polyols such as glycerin, diglycerin, sorbitol, propylene glycol, propanediol, panthenol, and sugar; alpha-hydroxyl acids and its salts; low molecular weight polyethylene glycols. Water-insoluble and water-dispersible skin and hair benefit actives include, but not limited to, petrolatum, silicones, vegetable oils, essential oils, emollients, hydrocarbon oils, fatty esters, cationic polymers, oils of high refractive index for shinning, anti-dandruff agents, proteins/protein derivatives, etc. These non water-soluble benefit agents normally exist as emulsions or stripes in the composition. Non-limiting examples in U.S. Pat. No. 7,262,158 are incorporated here by reference. Other miscellaneous skin and hair benefit actives may include vitamins, lipids (sucrose esters, lanoline, cholesterol, etc.), liposomes, essential fatty acids, butters, minerals, anti-microbial, anti-acne, oil control agents, astringents, oil control-agents, scrub and exfoliating particles, essential oils, sunscreens, styling aid, dye, perfume, cyclodextrin/perfume complex, anti-wrinkle actives (amino acids and their derivatives such as N-acetyl-L-cystein), thiols, anti-cellulite agents (caffeine, theophylline, etc.), tanning actives, skin lightening actives, skin soothing agents (such as bisabolol, aloe vera, dipotassium glycyrrhizinate, etc.).

Cationic water soluble/or dispersible polymers are very useful for the compositions according to this invention as conditioning actives or deposition aids. The suitable cationic polymers for the compositions according to this invention have a cationic charge density in the range of 0.2-8 meq/g and a molecular weight range of 1,000 to 3 million. Their cationic groups are nitrogen-containing moieties such as quaternary ammonium or cationic protonated amino moieties which can be primary, secondary, and tertiary amines. Non-limiting examples of the cationic polymers are described in the CTFA Cosmetic Ingredient Dictionary, 3rd edition, edited by Estrin, Crosley, and Haynes, and U.S. Pat. No. 8,470,305 B2, and U.S. Pat. No. 8,105,994 B2. Non-limiting examples may include copolymers of vinyl monomers having cationic protonated amines or quaternary ammonium functionalities with water-soluble spacer monomers such as acrylamide, methacrylamide, alkyl and dialkyl acrylamides, vinyl pyrrolidone, vinyl caprolactone, etc. Non-limiting specific examples are Polyquaternium-11, -16, -7, -6, -22, -47, -39. Other suitable cationic polymers include polysaccharide polymers such as cationic cellulose derivatives, cationic starch derivatives, cationic guar gum derivatives, etc. Non-limiting examples include the following trade name products: Jaguar® from Rhone Poulenc, Aqua® and N-Hance polymer from Aqualon, UCARE Polymer from Dow Chemical, MerQuat from Nalco, Galactasol from Henkel, etc.

D. Stabilizers and Further Thickeners

The stabilizers (or structuring systems) are used to form a crystalline stabilizing network in the composition, preventing the droplets of the lipophilic benefit agents from coalescing and phase separation in the product. Non-limiting examples include hydroxyl-containing fatty acids, fatty esters, or fatty soap water-insoluble wax-like substances such as 12-hydroxystearic acid, 9,10-dihydroxystearic acid, tri-9,10-dihydroxystearin, and tri-12-hydroxystearin. Other class of stabilizers is the $C_{10}$-$C_{22}$ ethylene glycol fatty acid ester, fumed silica, precipitated silica, smectite clay, etc. Other customary stabilizer examples are disclosed in U.S. Pat. Nos. 6,194,363 and 9,138,428. Another class of stabilizer is a gel-network of fatty amphiphiles such as stearic acid and behenyltrimethylammonium chloride, as disclosed in U.S. Pat. No. 8,470,305. Another class of stabilizer is a blend of non-modified and modified starch and fatty acid as disclosed in U.S. Pat. No. 6,906,016.

Further thickeners for stabilizing the composition and for modifying the viscosity of the composition, according to this invention, are polymers. Non-limiting examples include carbohydrate gums such as cellulose gum, microcrystalline cellulose, cellulose gel, hydroxyethyl cellulose, hydroxypropyl cellulose, sodium carboxymethylcellulose, methyl/propyl cellulose, guar gum, gum karaya, gum tragacanth, gum arabic, gum acacia, gum agar, xanthan gum, and mixtures thereof; modified and non-modified starch granules with gelatinization temperature between 30° C.-85° C., and pregelatinized cold water soluble starch. Further non-limiting examples include the class of hydrophobic associative, cross-linked, alkali swellable acrylate polymers, comprising acidic monomers and associative monomers having hydrophobic end groups, as disclosed in U.S. Pat. No. 9,161,899. Non-limiting commercial examples are Carbopol Aqua SF-1 of Lubrizol, Stabylen 30 of 3V Sigma S.P.A. Aqupec series of Sumitomo Seika of Japan.

Suitable further thickeners may include salt such as sodium chloride and sodium sulfate; cellulose derivatives, such as hydroethylcellulose; xanthan gum, guar gum; starch and starch derivatives; carboxyvinyl polymers, such as Carbopol® 940; Polyacrylate emulsions, such as Carbopol® Aqua SF-1 polymer; polyethylene glycol; and polyvinyl alcohol.

The preparation of the emulsions and suspension, according to this invention, comprises water; oils; emulsifiers; preferably 0.05% to 20% by weight, particularly preferably 0.1% to 10% by weight, especially preferably 0.5% to 5% by weight of the polyester of Formula-1; and other customary ingredients for skin care, hair care, and body care. The non-aqueous parts of the emulsion range normally from 2% to 85%, and preferably from 5% to 45%. The oils include, but are not limited to, cosmetic oils of refined vegetable oils, refined synthetic or fermented hydrocarbon oils, silicone oils, and synthetic ester oils.

The following non-limiting examples demonstrate the composition and the outstanding performances of this invention.

EXAMPLES

Example 1. Synthesis of polyalkoxylated polyols polyester of Formula-3 with different molecular structures. Table 1 listed the preparation of Formula-3 polyesters with a range of molecular weights of alkoxylated sorbitol and fatty acids. The reaction flask used is a one liter resin kettle with four necks. The sorbitol was mixed with KOH or NaOH base catalyst, and dried at 90° C.-110° C. under vacuum. X moles of ethylene oxide or a blend of ethylene oxide and propylene oxide per mole of sorbitol are added under pressure and reacted at 140° C.-180° C. over the course of 10-20 hours reaction time. After the reaction, the resulting product is cooled down, degassed, and filtered to obtain Sorbeth-xxx (see below table 1). The ingredients of Sorbeth-xxx, oleic acid or stearic acid, and the catalyst—methanesulfonic acid were added into the flask, followed by purging with nitrogen gas. The mixture was heated to between 120° C.-220° C. while mixing under the nitrogen and collecting the water. The reaction continued until the sum of $R_1$ (or acid value) reached the target or near constant. The products were collected after cooling the flak down to room temperature. The resulting polyesters were waxy solids.

TABLE 1

Synthesis of Formula-3 Polyesters

| | Polyester # | | | | | | | | |
|---|---|---|---|---|---|---|---|---|---|
| | 1-1 | 1-2 | 1-3 | 1-4 | 1-5 | 1-6 | 1-7 | 1-8 | 1-9 |
| Sorbeth-145 | 76.4% | | | | | | | | |
| Sorbeth-EO/PO 150/10 | | 81.3% | | | | | | | |
| Sorbeth-160 | | | 80.5% | | | | | | |
| Sorbeth-170 | | | | 81.4% | | | | | |
| Sorbeth-220 | | | | | 84.9% | 87% | 86.9% | | |
| Sorbeth-300 | | | | | | | | 90.8% | 88.1% |
| Isostearic acid | | | 19.1% | | | | | | |
| Oleic acid | 23.2% | 18.3% | | | 14.7% | | | | |
| Stearic Acid | | | | 18.2% | | 12.6% | 12.7% | 8.8% | 11.5% |
| 70% methanesulfonic acid | 0.4% | 0.4% | 0.4% | 0.4% | 0.4% | 0.4% | 0.4% | 0.4% | 0.4% |

Example 2. The polyester #1-6 of Table 1 of this invention and PEG-150 Pentaerythrityl Tetersterate were formulated in a non-sulfate personal cleansing composition of 6% of Potassium Cocoyl glycinate (Amilite GCK-11F from Ajinomoto Inc), 15% Cocamidopropyl Betaine (35% active by weight, trade name—Monteric LMAB), 0.3% EDTA, 78.7% water, and citric acid to pH 6. The potassium cocoyl glycinate surfactant is derived from the glycine amino acid, and is known to be very mild to the skin. The trade name of PEG-150 Pentaerythrityl tetrastearate is CROTHIX by Croda Inc, and is based on U.S. Pat. No. 5,192,462.

At 2% by weight of thickeners, the Polyester-6 of this invention resulted in a viscosity of 72,900 cP whereas the CROTHIC resulted in a viscosity of 45,840 cP. This shows the superior performance of the polyesters of this invention over the prior art.

Example 3. This personal cleansing formulation is based on another amino acid derived surfactant—sodium cocoyl sarcosinate. Its composition is 29.89% of sodium cocoyl sarcosinate (Trade name—Protelan LS 9011 by Zschimmer & Schwarz, 29% by weight of active), 12.38% of cocamidopropyl betaine (Trade name—Monateric LMAB, 35% by weight of active), 1.8% of thickener, 1% of cocamide MEA, 0.1% EDTA, 1% NaCl, 53.83% of water, and citric acid to pH 6. At 1.8% by weight in the formulation, Polyester #1-7 of this invention resulted in 6960 cP viscosity whereas CROTHIX resulted in 3640 cP.

Example 4. This personal cleansing formulation is based on the non-ionic alkyl polyglucoside surfactant and the anionic sodium cocoyl isethionate, two well-known mild and non-sulfate surfactants in the personal cleansing market. The composition is 13% Decyl glucoside (Trade name—Plantaren 2000 N UP by BASF), 7% of sodium cocoyl isethionate (Trade name—Pureact I-78C), 7% of cocamidopropyl betaine (Trade name—Montaric LMAB), 1% PEG-7 glyceryl cocoate (Trade name—Protachem GC-7 by Protameen Inc), 0.35% EDTA, citric acid to pH 5.5, and water. At the same 1.2% by weight, the Polyester #1-4 of this invention and CROTHIX thickened the above surfactant formulation to 26340 cp and 22200 cP, respectively. The polyester 4 of this invention showed a superior performance over the CROTHIX of the prior art again.

Example 5. This formulation is the classical sulfate surfactant cleansing products: 10.7% of sodium lauryl ether sulfate solution (70% active by weight), 8.58% of Cocamidopropyl betaine (35% active by weight), 0.25% Cocamide MEA, 0.2% EDTA, 0.5% NaCl, x % of thickener, and 79.57% of water. Its pH is 5.5. The Polyester #1-5 of this invention in Table 1 was compared with three commercial thickeners in this sulfate cleansing formulation: 1) Trade name: CROTHIX, solid form, supplied by Croda. INCI: PEG-150 Pentaerythrityl Tetrastearate; 2) Trade name: Glucamate DOE-120, supplied by Lubizol Inc. INCI name: PEG-120 Methyl Glucose Dioleate; 3) Trade name: Rewopal PEG 6000 DS, supplied by Evonik Inc. INCI name: PEG-150 Distearate.

TABLE 2

Thickening Performance Comparison in sulfate surfactant product

| | % concentration of thickener | | |
|---|---|---|---|
| | 0.2% | 0.4% | 0.6% |
| Polyester # 1-5 | 16580 cP | 37960 cP | 56720 cP |
| CROTHIX | 9760 cP | 21840 cP | 35280 cP |
| Glucamate DOE120 | 500 cP | 600 cP | 700 cP |
| Rewopal PEG 600 DS | 500 cP | 1560 cP | 3040 cP |

This result demonstrated the superior performance of the thickeners of the embodiments of this invention over many of the commercial thickeners of the prior art in the classical sulfate surfactant personal cleansing products. This and other examples demonstrated that a wide range of the polyesters of embodiments of this invention were more effective and versatile thickeners than the current commercial products of prior art in a wide range of personal cleansing products with different types of surfactants.

Example 6. Comparative analysis was done by synthesizing four polyesters (Polyester A, B, C, and D), according to the examples of Chen et al., US 2013/0079536 A1. A control polyester, which is Polyester #4-4, is included to determine the thickening properties of the four polyesters.

Polyester A

Sorbeth-50 (PEG-50 Sorbitol) (169.25 g, 67.7% by weight), Polyhydroxystearic acid (AC #41) (80.50 g, 32.2%), and Tin Oxalate catalyst (0.25 g, 0.1%) were charged into a glass reactor. They were mixed at 190-200 C for 24 hr under a nitrogen pressure. After cooling down to below 100 C, it was discharged to be Polyester A with HLB about 13.5.

Polyester B

Same conditions as with Polyester A, but with Sorbeth-50 (PEG-50 Sorbitol) (78.25 g g, 31.3% by weight), Hydroxystearic acid (171.50 g, 68.6%), and Tin Oxalate (0.25%, 0.1%). Its HLB is about 6.3

Polyester C

It was prepared under the similar condition—24 hr. at 200 C with Sorbeth-230 (PEG-230 Sorbitol) (258.82 g, 86.27% by weight), Hydroxystearic acid (HAS) (40.48 g, 13.53%), and Tin Oxalate (0.25%, 0.1%). About half of it was discharged to become Polyester C. It has one hydroxystearic acid unit in $R_3$.

Polyester D

An extra 28.60 g of hydroxystearic acid was charged into the polyester C (211.38 g) in the reactor, and mixed at 200 C under nitrogen pressure for an extra 20 hr. until the AC # was 4.4. It was discharged to become Polyester D. It has two hydroxystearic acid units in $R_3$.

These four comparative polyesters, and a control polyester (a preferred polyester of the present application), were used as a thickener in a standard shampoo formulation preparation, under standard processing conditions for shampoo in beauty industry. They were dissolved into the shampoo formulation while mixing at 70-90° C. Their viscosities are measured, and an average viscosity of three measurements at 24.5° C. is reported below. The shampoo composition by weight is: Water, 57.06%; Cocamidopropyl Betain (30% conc.), 11.5%; Sodium $C_{14-16}$ Olefin Sulfonate, 30%; and Polyester, 1.44%.

TABLE 3

| Polyester | m | total n | # of $R^3$ | $R^3$ | average viscosity, cP |
|---|---|---|---|---|---|
| A | 6 | 50 | 6 | Oligomer, 4.5 HSA unit | 20.4 |
| B | 6 | 50 | 6 | Oligomer, 2.8 HSA Unit. | 19.2 |
| C | 6 | 230 | 5 | One HSA | 220 |
| D | 6 | 230 | 5 | 2 HSA | 0 |
| Polyester #4-4 | 6 | 230 | 5 | Oleic acid | 14,900 |

As seen from the average viscosity (cP) no useful thickening was found in Chen's Polyesters A-D, which are made of hydroxystearic acid (HSA) and polyhydroxystearate. Chen et al claims $R^3$ is independently a residue of a polyhydroxyalkyl or polyhydroxyalkenyl carboxylic acid, a residue of a hydroxyalkyl carboxylic acid or hydroxyalkenyl carboxylic and/or a residue of an oligomer of the hydroxyalkyl or hydroxyalkenyl carboxylic aid.

Example 8. Polyesters 4-1 to 4-11 and C and D were prepared and viscosity was recorded below in addition to characteristics of each polyester in accordance with Formula 2 of the present application. Table 5 below shows the results.

The polyesters with viscosities above about 2500 cP gave good or excellent thickening results whereas those with viscosities below about 2500 cP gave poorer thickening and/or unsatisfactory results (0-220=no thickening, 1220-1240=very little thickening, 2000-2980=some thickening, 3400-7300=good thickening, 12600-15000=strong thickening and 21000 and greater-=strong thickening). Table 4 showed a number of very surprisingly unexpected results from the view of a skilled person in the art. 1). Polyesters 1-5 with increasing #(12 to 18) of carbon in $R_1$ continued to increase thickening viscosity. Yet, Polyester-6 with a $R_1$ of 22 carbons exhibited a sharp drop in thickening viscosity; a skilled person would have expected the opposite. 2). Polyester C and D of Chen's prior art, having $R_1$ derived from hydroxystearic acid, showed no significant thickening at all. 3). Polyesters-7,8,4,9, and 10 with a total n of 135, 170, 230, 200, and 400, respectively, exhibited the best thickening viscosity of 14900 cp at a total n=230. In other words, higher molecular weight did not lead to a higher thickening efficacy. These results are not linear, and are un-expected and novel from prior art by a skilled person in the art.

Example 7. The Organization for Economic Co-Operation and Development (OECD) has developed multiple methods for evaluating the environmental impacts of manufactured chemicals. The OECD 301B series of tests which utilize inoculum sourced from wastewater treatment plants to provide a reasonable profile of bacteria have become standard methods of measuring the biodegradation of a chemical and its impact on the environment.

The OCED 301B test was employed which, as noted above, measures carbon dioxide generated by complete breakdown of a chemical's carbon content. In order to disperse the Polyesters of this invention into the inoculum of the test, it was mixed with a non-biodegradable surfactant (Pluronic P123) at the ratio of 2/1 (Surfactant/Polyester), and dispersed the blend with an ultrasound probe into the water. The resulting dispersion is mixed into the inoculum, and the carbon dioxide released is measured periodically. After 28 days, the measured biodegradation data was presented in Table 5 below. These data showed at least the following results: 1). Polyester 5-2, 5-3, and 5-4 of the present application showed the best and excellent biodegradation results of 41.8±2.1%, 42.2±3.2%, and 42.2±3.2%, respectively. 2). Polyester 5-7 with a total n of 400 showed an unexpected drop of biodegradation to 17.3±4.9%.

TABLE 4

| Polyester | m | total n | $R_1$ derived from | # of C in R1 | # of $COR_1$ | Viscosity, cP |
|---|---|---|---|---|---|---|
| 4-1 | 6 | 230 | Lauric acid | 12 | 5 | 160 |
| 4-2 | 6 | 230 | Myristic acid | 14 | 5 | 1240 |
| 4-3 | 6 | 230 | Palmitic Acid | 16 | 5 | 2980 |
| 4-4 | 6 | 230 | Oleic acid | 18 | 5 | 14900 |
| 4-5 | 6 | 230 | Stearic acid | 18 | 5 | 12680 |
| 4-6 | 6 | 230 | Behenic Acid | 22 | 5.1 | 1220 |
| C | 6 | 230 | Hydroxystearic acid | 18 | 5 | 220 |
| D | 6 | 230 | 2 HSA | 36 | 5 | 0 |
| 4-7 | 6 | 135 | Oleic acid | 18 | 5 | ~20 |
| 4-8 | 6 | 170 | Oleic acid | 18 | 5 | ~2000 |
| 4-4 | 6 | 230 | Oleic acid | 18 | 5 | 14900 |
| 4-9 | 6 | 300 | Oleic acid | 18 | 5 | 7269 |
| 4-10 | 6 | 400 | Oleic acid | 18 | 5 | 3469 |
| 4-11 | 6 | 230 | Oleic acid | 18 | 5.6 | 21000 |

TABLE 5

| Polyester | m | total n | $R_1$ derived from | # of C in R1 | # of $COR_1$ | % biodegradation |
|---|---|---|---|---|---|---|
| 5-1 | 6 | 135 | Oleic acid | 18 | 5.5 | 33.8 ± 1.9% |
| 5-2 | 6 | 230 | Oleic acid | 18 | 5.5 | 41.8 ± 2.1% |
| 5-3 | 6 | 230 | Stearic acid | 18 | 5.5 | 42.2 ± 3.2% |
| 5-4 | 6 | 230 | Behenic Acid | 22 | 5.5 | 39.2 ± 7.3% |
| 5-5 | 6 | 230 | Oleic acid | 18 | 4 | 19.60% ± 0.70% |
| 5-6 | 6 | 230 | Oleic acid | 18 | 3.1 | 11.90% ± 1.40% |
| 5-7 | 6 | 400 | Oleic acid | 18 | 5.5 | 17.3 ± 4.9% |
| C | 6 | 230 | Hydroxystearic acid | 18 | 5 | 22.3 ± 2.1% |

Thus, in an embodiment of the invention, the viscosity amount is an amount that is greater than about 2000 cP, or greater than about 3400 cP, or greater than about 12000 cP, or greater than about 20000 cP. In an embodiment of the invention, the % biodegradation as measured by the OCED 301B test is more than about 19%, or more than about 23%, or more than about 26%, or more than about 30%.

In a variation of the invention, the number of carbon atoms in $R_1$ is 18. In an embodiment of the invention, the fatty acid from which $R_1$ is derived from is oleic acid, stearic acid, isostearic acid, or mixtures thereof. In a variation of the invention, the fatty acid from which $R_1$ is derived from is not hydroxystearic acid.

In a variation, the polyesters of the present invention have at least good or very good, or excellent thickening properties and good biodegradability properties.

What is claimed is:

1. A thickening agent comprising the formula:

$$Q\text{-}[(OA)_n\text{-}OR]_m \quad \text{Formula-2}$$

Q is sorbitol;
A is selected from —$C_2H_4$— or —$C_3H_6$—;
R is independently selected from hydrogen or —$COR_1$,
$R_1$ is independently selected from $C_{16}$-$C_{18}$-alkyl or $C_{16}$-$C_{18}$-alkenyl,
n is an integer selected from 1-125 and may be the same or different for each polyalkoxylated hydrophilic arm; total n is in a range of 180-400;
wherein the average total number of COR1 is less than or equal to m;
m is an integer selected from 6-25;
Wherein the thickening agent exhibits at least six polyalkoxylated hydrophilic arms emanating from a central core, with at least four arms being capped by a hydrophobic group;
Wherein the % biodegradation as measured by OECD 301B is more than about 19%;
Wherein the thickening agent added to a cleansing product causes a thickening viscosity of the cleansing product to be greater than about 2000 cP when measured at room temperature, and wherein the thickening agent does not comprise sorbeth-220.

2. The thickening agent of claim 1 wherein $R_1$ is derived from oleic or stearic acid moieties, or mixtures thereof.

3. A cosmetic, dermatological, or pharmaceutical composition comprising the thickening agent of claim 2, or mixtures thereof.

4. A cosmetic, dermatological, and pharmaceutical composition of claim 3, further comprising:
Water;
2%-50% by weight of surfactants selected from the groups consisting of: sulfate-free anionic surfactants, non-ionic surfactant, amphoteric surfactant, and mixtures thereof;
0.1% to 10% by weight of the polyalkoxylated polyols polyester of Formula-2; and
0.1% to 50% by weight of other ingredients selected from the group consisting of:
skin and hair benefit actives, stabilizers, further thickeners, colorants, and preservatives.

5. The thickening agent of claim 1, wherein $R_1$ is derived from stearic, isostearic, oleic moieties, or mixtures thereof.

6. A cosmetic, dermatological, or pharmaceutical composition comprising the thickening agent of claim 5, or mixtures thereof.

7. The cosmetic, dermatological, and pharmaceutical composition of claim 6, further comprising:
Water; and
1%-50% by weight of surfactants selected from the groups consisting of: anionic surfactant, cationic surfactant, non-ionic surfactant, amphoteric surfactant, and mixtures thereof;
0.1% to 10% by weight of the polyols polyester of Formula-2; and
0.1 to 50% by weight of other ingredients selected from the groups consisting of:
skin and hair benefit actives, stabilizer, further thickeners, colorants, preservatives, and pearlizing agents.

8. The cosmetic, dermatological, and pharmaceutical composition of claim 6, further comprising:
Water; and
1%-50% by weight of surfactants selected from the groups consisting of: anionic surfactant, cationic surfactant, non-ionic surfactant, amphoteric surfactant, and mixtures thereof;
0.1% to 10% by weight of the polyols polyester of Formula-2; and
0.1 to 50% by weight of other ingredients selected from the groups consisting of:
skin and hair benefit actives, stabilizer, further thickeners, colorants, preservatives, and pearlizing agents.

9. A household, industrial and institution composition comprising the thickening agent of claim 5, or mixtures thereof.

10. The thickening agent of claim 5 wherein $R_1$ is derived from oleic acid.

11. The thickening agent of claim 1, wherein an average $COR_1$ number is from about 5 to about 6.

12. A cosmetic, dermatological, or pharmaceutical composition comprising the thickening agent of claim 11, or mixtures thereof.

13. The cosmetic, dermatological, and pharmaceutical composition of claim 12 further comprising:
Water; and
1%-50% by weight of surfactants selected from the groups consisting of: anionic surfactant, cationic surfactant, non-ionic surfactant, amphoteric surfactant, and mixtures thereof;

0.1% to 10% by weight of the polyalkoxylated polyols polyester of Formula-3; and 0.1 to 50% by weight of other ingredients selected from the groups consisting of:

skin and hair benefit actives, stabilizer, further thickeners, colorants, preservatives, and pearlizing agents.

14. A cosmetic, dermatological, or pharmaceutical composition comprising the thickening agent of claim 1, or mixtures thereof.

15. The cosmetic, dermatological, and pharmaceutical composition of claim 7, comprising 0.1% to 10% by weight of the polyols polyester of Formula-2 and further comprising:

Water;

1%-50% by weight of surfactants selected from the groups consisting of anionic surfactant, cationic surfactant, non-ionic surfactant, amphoteric surfactant, and mixtures thereof; and 0.1 to 50% by weight of other ingredients selected from the groups consisting of:

skin and hair benefit actives, stabilizers, further thickeners, colorants, preservatives, and pearlizing agents.

16. The cosmetic, dermatological, and pharmaceutical composition of claim 14 further comprising:

Water; and about 1% to 30% by weight of a skin and hair active ingredient selected from the group consisting of: UV filters, moisturizers, conditioners, antiseptic agents, deodorant actives, reducing agents for permanent wave products, colorants for coloring hair, anti-aging actives, proteins/protein derivatives, perfume, petrolatum, vegetable oils, cationic conditioning polymers, and mixtures thereof; and about 1% to 10% by weight of the polyalkoxylated polyols polyester of Formula-2.

17. The cosmetic, dermatological, or pharmaceutical composition of claim 14 wherein the composition exhibits a viscosity of at least 12000 cP when measured at room temperature.

18. A cosmetic, dermatological, or pharmaceutical composition of claim 1, wherein the thickening agent comprises a compound of Formula-3:

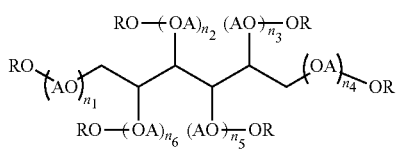

Formula-3

A is independently —$C_2H_4$— or —$C_3H_6$—;

R is hydrogen or a group of formula —$COR_1$,

Wherein $R_1$ is derived from stearic, isostearic, or oleic moieties, or mixtures thereof;

Wherein the average total number of —$COR_1$ groups is from 3-6;

$n_1$ to $n_6$ are independently integers from 1-125; and total n is from 180-300.

19. The thickening agent of claim 1 wherein the thickening agent displays a biodegradation of at least 20% after 28 days.

20. The thickening agent of claim 1 wherein a total n is about 230.

21. The thickening agent of claim 1 wherein $R_1$ is a $C_{18}$ fatty acid that comprises an alkyl or alkenyl moiety.

22. The thickening agent of claim 1, wherein the average total number of $COR_1$ is between 5 and 5.6.

23. A thickening agent comprising the formula:

$$Q\text{-}[(OA)_n\text{-}OR]_m \qquad \text{Formula-2}$$

Q is a radical of natural or synthetic organic polyol compounds having from 6 to 50 carbon atoms forming a straight, a branched, a cyclic, a saturated, or an unsaturated structure, Wherein Q is substituted with 6 to 25 groups having the formula —$[(OA)_n\text{-}OR]$, and Wherein each of the 6 to 50 carbon atoms may independently be substituted with hydrogen, oxygen, or nitrogen;

A is selected from —$C_2H_4$— or —$C_3H_6$—;

R is independently selected from hydrogen or —$COR_1$, $R^1$ is independently selected from $C_{16}$-$C_{18}$-alkyl or $C_{16}$-$C_{18}$-alkenyl, n is an integer selected from 1-125 and may be the same or different for each polyalkoxylated hydrophilic arm; total n is in a range of 200-300;

Wherein the average total number of $COR_1$ is less than or equal to m;

m is 6;

Wherein the thickening agent exhibits at least six polyalkoxylated hydrophilic arms emanating from a central core, with at least four arms being capped by a hydrophobic group;

Wherein the % biodegradation as measured by OECD 301B is more than about 19%;

Wherein the thickening agent added to a cleansing product causes a thickening viscosity of the cleansing product to be greater than about 2000 cP when measured at room temperature, and wherein the thickening agent comprises sorbeth-220.

24. The thickening agent of claim 23, wherein Q is one or more polyols selected from the group consisting of: disaccharide(s), having a glycosidic linkage.

* * * * *